(12) United States Patent
Krol

(10) Patent No.: US 7,131,516 B1
(45) Date of Patent: Nov. 7, 2006

(54) SAFETY AND ACCESSIBILITY ASSEMBLY

(76) Inventor: Henry Krol, 50571 Lagae, New Baltimore, MI (US) 48047

( * ) Notice: Subject to any disclaimer, the term of this patent is extended or adjusted under 35 U.S.C. 154(b) by 201 days.

(21) Appl. No.: 10/812,247

(22) Filed: Mar. 29, 2004

(51) Int. Cl.
E06C 1/36 (2006.01)
E06C 9/00 (2006.01)

(52) U.S. Cl. .......................... 182/206; 182/82; 182/92

(58) Field of Classification Search ............... 182/82, 182/90, 92, 206, 120, 121, 122; 114/362; 260/166, 165, 163
See application file for complete search history.

(56) References Cited

U.S. PATENT DOCUMENTS

| 1,419,834 | A |   | 6/1922  | Fellows          |         |
|-----------|---|---|---------|------------------|---------|
| 1,736,825 | A |   | 11/1929 | Griffin          |         |
| 2,448,716 | A |   | 9/1948  | Hurd             |         |
| 3,231,043 | A | * | 1/1966  | Brown            | 182/152 |
| 3,315,762 | A |   | 4/1967  | Torrey           |         |
| 3,731,761 | A |   | 5/1973  | Glenn            |         |
| 3,865,431 | A | * | 2/1975  | Zakhi            | 182/150 |
| 3,970,169 | A |   | 7/1976  | Hernandez Gonzalez |       |
| 4,067,412 | A |   | 1/1978  | Jackson          |         |
| 4,222,136 | A | * | 9/1980  | Valentino        | 182/92  |
| 4,280,429 | A |   | 7/1981  | Wells            |         |
| 4,425,985 | A |   | 1/1984  | Geisel et al.    |         |
| 4,495,883 | A | * | 1/1985  | Hoy              | 114/362 |
| 4,907,674 | A | * | 3/1990  | Miller           | 182/150 |
| 4,911,264 | A | * | 3/1990  | McCafferty       | 182/92  |
| 4,947,961 | A | * | 8/1990  | Dudley           | 182/92  |
| 5,875,727 | A |   | 3/1999  | Elson et al.     |         |
| 6,158,549 | A |   | 12/2000 | Hartman, Jr.     |         |
| 6,547,485 | B1|   | 4/2003  | Elson            |         |
| 6,767,023 | B1| * | 7/2004  | Nicholson        | 280/165 |

* cited by examiner

Primary Examiner—Hugh B. Thompson, II
(74) Attorney, Agent, or Firm—Law Offices of John Chupa and Associates, P.C.

(57) ABSTRACT

A safety and accessibility assembly (10) having a pair of substantially identical hook portions (20, 26) which are coupled to a support frame having several pillar portions (12, 14, 16, 18), wherein the pillar portions (12, 14, 16, 18) are coupled to a platform portion (30). Particularly, the hook portions (20, 26) are adapted to removably and frictionally couple to a sea wall (100), thereby suspending the pillar portions (12, 14, 16, 18) and the platform (30) above a body of water (200), effective to allow accessibility into and out of the body of water (200) despite the level of the water (202).

18 Claims, 2 Drawing Sheets

SAFETY AND ACCESSIBILITY ASSEMBLY

FIELD OF THE INVENTION

The present invention generally relates to a safety and accessibility assembly and, more particularly, a safety and accessibility assembly having a pair of stabilization and attachment hooks, each of which are adapted to securely suspend a platform from a sea wall, effective to provide entry to and exit from a boat or water conveyance or entry to and exit from the water when the water level is substantially lower than the top of a sea wall, thereby providing individuals with a stable platform to stand upon while concomitantly obviating potential injury from entering or exiting a boat, water, or other water conveyance when the water level is substantially lower than the top of a sea wall.

BACKGROUND OF THE INVENTION

Oftentimes, bodies of water are contained, controlled, or otherwise augmented by use of a conventional sea wall. Individuals that own property or access to the body of water may be forced to dock a boat, other water conveyance, or enter and exit the body of water via the sea wall rather than a conventional dock. In these cases, the individuals are forced to accept the ever changing water levels of the body of water and to gain access to the body of water, boat, or other water conveyance despite the level of the water. As is well know, a sea wall is a substantially fixed structure that may not be readily raised or lowered and, this substantially fixed structure remains at a fixed height despite the level of water in which the sea wall is disposed.

Oftentimes, the level of water relative to the sea wall is substantially lower than the top of the sea wall. During these frequent occurrences, individuals that desire to gain access to the body of water, boat, or other water conveyance are typically forced to either abstain from gaining access to the body of water, boat, or other water conveyance or forced to literally jump or throw their bodies from the top of the sea wall in attempts to gain access to the body of water, boat, or other water conveyance, all while concomitantly attempting to avoid injury from such a fall. Moreover, if the individuals opted to jump from the sea wall, they still must find a way to exit the body of water, boat, or other water conveyance. Typically, average individuals cannot negotiate more than a couple of feet difference between the surface of water and the top of a sea wall, thereby forcing the individuals to find an alternate exit point, if one even exists. If the individuals are attempting to exit from a boat or other water conveyance, the individuals may successfully leap from the boat or other water conveyance and reach the top of the sea wall, however if the distance from the boat surface to the top of the sea wall is greater than the individual's body height, an average individual cannot leap high enough from a moving surface to even grab the top of the sea wall, thereby forcing the individual to find an alternate exit point from the boat or other water conveyance, if one even exists.

During winter months, these bodies of water typically freeze at a substantially low level with respect to the top of the sea wall, thereby posing an extremely dangerous fall to an individual that desires to perform such activities as ice fishing or ice skating. Moreover, upon gaining access to the surface of the ice, the individuals must also find a way to exit the surface of the ice upon completion of the aforementioned activities, if an alternate exit point even exists.

There is therefore a need for an assembly which allows an individual or group of individuals to gain access to and exit from a boat, other water conveyance, or the body of water from a sea wall despite the level of the water in respect to the top of the sea wall. There is still a need for an assembly which may be selectively and removably disposed upon a sea wall which allows an individual or group of individuals to gain access to and exit from a boat, other water conveyance, or the body of water from a sea wall despite the level of the water in respect to the top of the sea wall, and which overcomes some or all of the previously delineated drawbacks of prior traversal from sea wall to water line, boat, or other water conveyance methodologies.

SUMMARY OF THE INVENTION

A first non-limiting advantage of the present invention is that it provides an assembly which allows for the selective traversal from the top of a sea wall to the water line of a body of water, boat resting upon the body of water, or other water conveyance resting upon the water in a manner which overcomes the previously delineated drawbacks of prior traversal from sea wall to water line, boat, or other water conveyance methodologies.

A second non-limiting advantage of the invention is that it provides an assembly which allows for the selective traversal from the top of a sea wall to the water line of a body of water, boat resting upon the body of water, or other water conveyance resting upon the water in a manner which overcomes the previously delineated drawbacks of prior traversal from sea wall to water line, boat, or other water conveyance methodologies, and which, by way of example and without limitation, selectively and removably affords an individual a substantially safe traversal from the top of a sea wall to the water line of a body of water, top of a boat resting upon the body of water, or other water conveyance resting upon the water.

A third non-limiting advantage of the present invention is that it provides an assembly which allows for the substantially safe traversal from a sea wall to a water line and from a water line to a sea wall and, by way of example and without limitation, an assembly which includes a cavity which may be filled with either a buoyant material or a non-buoyant material.

A fourth non-limiting advantage of the present invention is that it provides an assembly comprising a pair of substantially identical hook portions which are each coupled to at least one platform, said pair of hook portions frictionally engaging a portion of a sea wall to suspend said platform above a body of water.

A fifth non-limiting advantage of the present invention is that it provides a safety and accessibility assembly for use with a sea wall. Particularly, the assembly comprises a first hook portion having a generally hollow cavity therein; a second hook portion having a generally hollow cavity therein, said second hook portion being substantially identical to said first hook portion; a first vertical pillar portion which is disposed within said generally hollow cavity of said first hook portion; a second vertical pillar portion which is disposed within said generally hollow cavity of said second hook portion; a first angled pillar portion which is disposed within said cavity of said first hook portion, said first angled pillar portion abutting said first vertical pillar portion within said cavity; a second angled pillar portion which is disposed within said cavity of said second hook portion, said second angled pillar portion abutting said second vertical pillar portion within said cavity; and at least one platform which is coupled to said pillar portions at an end opposite of said hook portions.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

The present invention may be understood more readily by reference to the following detailed description of preferred embodiments of the invention.

Before the present methods and apparatuses are disclosed and described, it is to be understood that the terminology used herein is for the purpose of describing particular embodiments only and is not intended to be limiting. It must be noted that, as used in the specification and the appended claims, the singular forms "a", "an", and "the" include plural referents unless the context clearly dictates otherwise.

Figure 1:
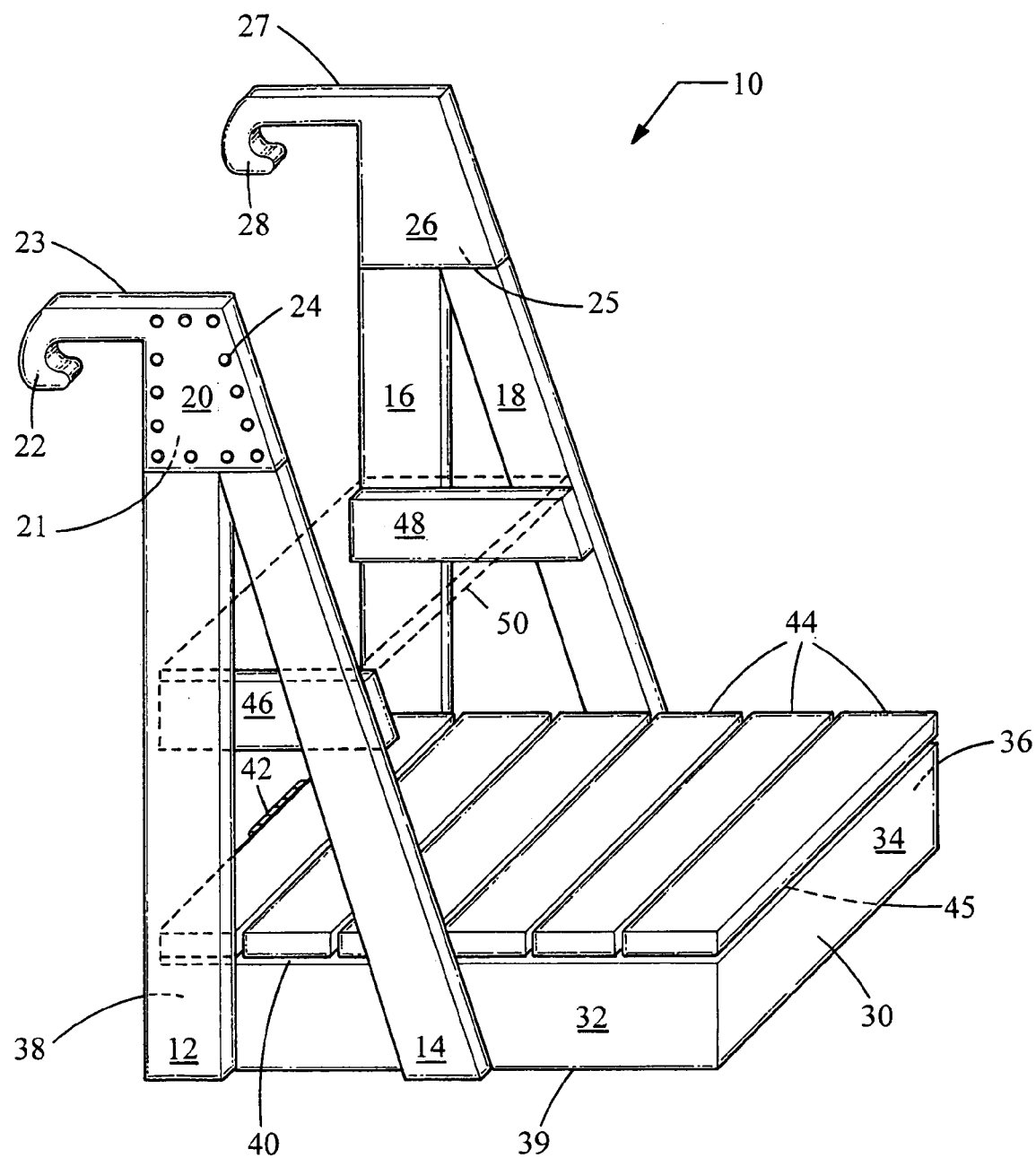
FIG. 1 is a disassembled partial perspective view of a conveyance stabilization assembly which is made in accordance with the teachings of the preferred embodiment of the invention.

Referring now to FIG. 1, there is shown a safety and accessibility assembly 10 which is made in accordance with the teachings of the preferred embodiment of the invention. As shown, the assembly 10 includes a first vertical pillar portion 12, a second vertical pillar portion 16, a first angled pillar portion 14, a second angled pillar portion 18, a first platform 30, a first hook portion 20, and a second hook portion 26 which is substantially identical to the first hook portion 20. Particularly, the first vertical pillar portion 12 and the first angled pillar portion 14 are disposed within the cavity 21 of the first hook portion 20 and coupled together by use of conventional attachment devices 24 (e.g., rivets, bolts, nails, screws, welds, and/or the like) which are driven/melted through the first hook portion 20 and into the pillars 12, 14, thereby containing the pillars 12, 14 and coupling the pillars 12, 14 at a certain angle (e.g., approximately twenty-five to fourty-five degrees). It should be appreciated that the arm portion 23 of the first hook portion 20 is perpendicular to the first vertical pillar portion 12 (i.e., the first vertical pillar portion 12 and the arm portion 23 of the first hook portion 20 form a ninety degree angle). In an alternate embodiment, the hook portions 20, 26 are solid and do not have cavities.

The second vertical pillar portion 16 and the second angled pillar portion 18 are disposed within the cavity 25 of the second hook portion 26 and coupled together by use of conventional attachment devices 24 (e.g., rivets, bolts, nails, screws, welds, and/or the like) which are driven/melted through the second hook portion 26 and into the pillars 16, 18, thereby containing the pillars 16, 18 and coupling the pillars 16, 18 at a certain angle (e.g., approximately twenty-five to fourty-five degrees). It should be appreciated that the arm portion 27 of the second hook portion 26 is perpendicular to the second vertical pillar portion 16 (i.e., the second vertical pillar portion 16 and the arm portion 27 of the second hook portion 26 form a ninety degree angle).

The first and second hook portions 20, 26 each include a respective grip portion 22, 28, respectively which are each adapted to engage a portion of a sea wall, such as sea wall 100, thereby suspending the assembly 10 from a sea wall while concomitantly gripping the sea wall, effective to maintain the position of the assembly 10 upon the sea wall.

As briefly mentioned above, the assembly 10 also includes a first platform 30. Particularly, the first platform 30 is generally rectangular in shape and includes a first side 32 (i.e., the first side 32 hereinafter is sometimes referred to as "left side"), a second side 34 (i.e., the second side 34 is hereinafter sometimes referred to as "front side"), a third side 36 (i.e., the third side 36 is hereinafter sometimes referred to as "right side"), and a fourth side 38 (i.e., the fourth side 38 is hereinafter sometimes referred to as "back side"). The first platform 30 further includes a bottom side 39 and a top side 44.

In one non-limiting embodiment of the present invention, the first platform 30 may also include a selectively movable lid portion 40 which is movably coupled to the back side 38. In this non-limiting embodiment, the selectively movable lid portion 40 is movably disposed between the top side 44 and the first, second, third, and fourth sides 32, 34, 36, 38. Also, in this non limiting embodiment, a bottom portion covers the bottom side 39. Moreover, as should be understood, the assembled relationship of the first, second, third, and fourth sides 32, 34, 36, 38 and the bottom side 39 creates a generally hollow cavity 45, in which a plurality of substantially any desired objects may be disposed, contained, and protected. In yet another non-limiting embodiment, the selectively movable lid portion 40 may also include a locking assembly (not shown) which is coupled to both the front side 34 and the top side 44, thereby allowing the selectively movable lid portion 40 to be locked in a closed position (i.e., the term "closed position" hereinafter refers to a position in which the generally hollow cavity is not accessible, while the future use of the term "open position" may refer to a position in which the lid 40 is selectively moved, thereby allowing access to the cavity 45), effective to securely and effectively contain desired objects while concomitantly deterring any unauthorized individual from removing the desired objects from within the cavity.

The first vertical pillar 12 and the first angled pillar 14 are coupled to the left side 32 of the first platform 30, such that the bottom side 39 is flush with the bottom of both of the pillars 12, 14 (i.e., the bottom side of the pillars 12, 14 is the point upon the pillars where the greatest amount of space exists between the pillars 12, 14). The second vertical pillar 16 and the second angled pillar 18 are coupled to the right side 36 of the first platform 30, such that the bottom side 39 is flush with the bottom of both of the pillars 16, 18 (i.e., the bottom side of the pillars 16, 18 is the point upon the pillars where the greatest amount of space exists between the pillars 16, 18). It should be appreciated that, in one non-limiting embodiment (i.e., the non-limiting embodiment which is discussed above with reference to the selectively movable lid portion 40 and the cavity 45), the pillars 12, 14, 16, 18 may be directly coupled to only the sides 32, 36, thereby allowing the lid portion 40 and the top side 44 to be selectively moved form a first closed position to a second open position in which the cavity 45 is accessible.

In the most preferred embodiment of the present invention, the first platform 30 is fixedly coupled to the pillar portions 12, 14, 16, 18 at every respective level of the first platform. That is, in the most preferred embodiment of the invention, the pillars 12, 14, 16, 18 are fixedly coupled to the left side 32, the right side 36, and the outside circumference (i.e., the left and right sides) of the top side 44. It should be appreciated, that in the most preferred embodiment of the invention, the selectively movable lid portion 40 may be removed and, inasmuch, the top side 44 may be directly coupled to the first, second, third, and fourth sides 32, 34, 36, 38. It should also be appreciated that the selectively movable lid portion 40 may not be removed and, in this manner, the lid portion also may be fixedly coupled to the pillars 12, 14, 16, 18 (i.e., the lid portion 40 may provide or contribute to the rigidity or sturdiness of the first platform 30, but may not be selectively movable.

In yet another non-limiting embodiment of the invention, the cavity portion 45 may be filled with either a buoyant material; such as Styrofoam or the like, thereby allowing the first platform 30 (i.e., and the assembly 10) to selectively raise with the level of a body of water (i.e., thereby protecting or keeping dry certain portions of the assembly 10), or a non-buoyant material, such as metal, sand, concrete, lead, and/or the like, thereby obviating the assembly 10 from floating upwards with rising water levels (i.e., in this manner, the assembly 10 will remain in a substantially fixed position upon a sea wall even in a situation where the water level may temporarily rise above the sea wall).

In yet another non-limiting embodiment of the present invention, the assembly 10 may further include a second platform or step 50. That is, in this non-limiting embodiment, a second platform 50 may be disposed approximately one-half of the distance between the top side 44 of the first platform 30 and the arm portions 23, 27 of the first and second hook portions 20, 26. This second platform may be disposed upon a pair of support beams 46, 48, which are fixedly coupled to the pillars 12, 14, 16, 18 and which run parallel to the left and the right sides 32, 36 of the first platform 30. That is, the support beam 46 may be coupled to the first pillars 12, 14, such that the first support beam 46 is perpendicular to the first vertical pillar 12. The second support beam 48 may be coupled to the second pillars 16, 18, such that the second support beam 48 is perpendicular to the second vertical beam 16. As should be appreciated, the second platform 50 may comprise substantially any desired and commercially available material, such as and without limitation, metal, wood, plastic, and/or the like. It should be further appreciated that the second platform 50 is disposed upon the first and second support beams 46, 48 and, in a manner which causes the left and right sides of the second platform 50 to abut the pillars 12, 14, 16, 18. Upon such disposal of the second platform 50, the platform 50 may then be removably coupled to the supports 46, 48, and the pillars 12, 14, 16, 18, fixedly coupled to the supports 46, 48, and the pillars 12, 14, 16, 18, fixedly coupled to the supports 46, 48, removably coupled to the supports 46, 48, fixedly coupled to the pillars 12, 14, 16, 18, or removably coupled to the pillars 12, 14, 16, 18.

Figure 2:
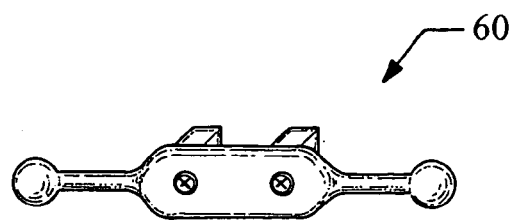
FIG. 2 is an assembled partial perspective view of the conveyance stabilization assembly which is shown in FIG. 1.

In one non-limiting embodiment of the present invention and with reference to FIG. 2, the assembly 10 may include a fastening assembly 60. That is, in this non-limiting embodiment, the fastening assembly 60 may be coupled to substantially any desired location upon the assembly 10 by use of conventional fastening means (e.g., screws, bolts, welds, and/or the like). In this manner, the fastening assembly 10 may be utilized to secure a water craft to the assembly 10 in a conventional manner (e.g., conventional rope, tie downs, and/or the like).

Figure 3:
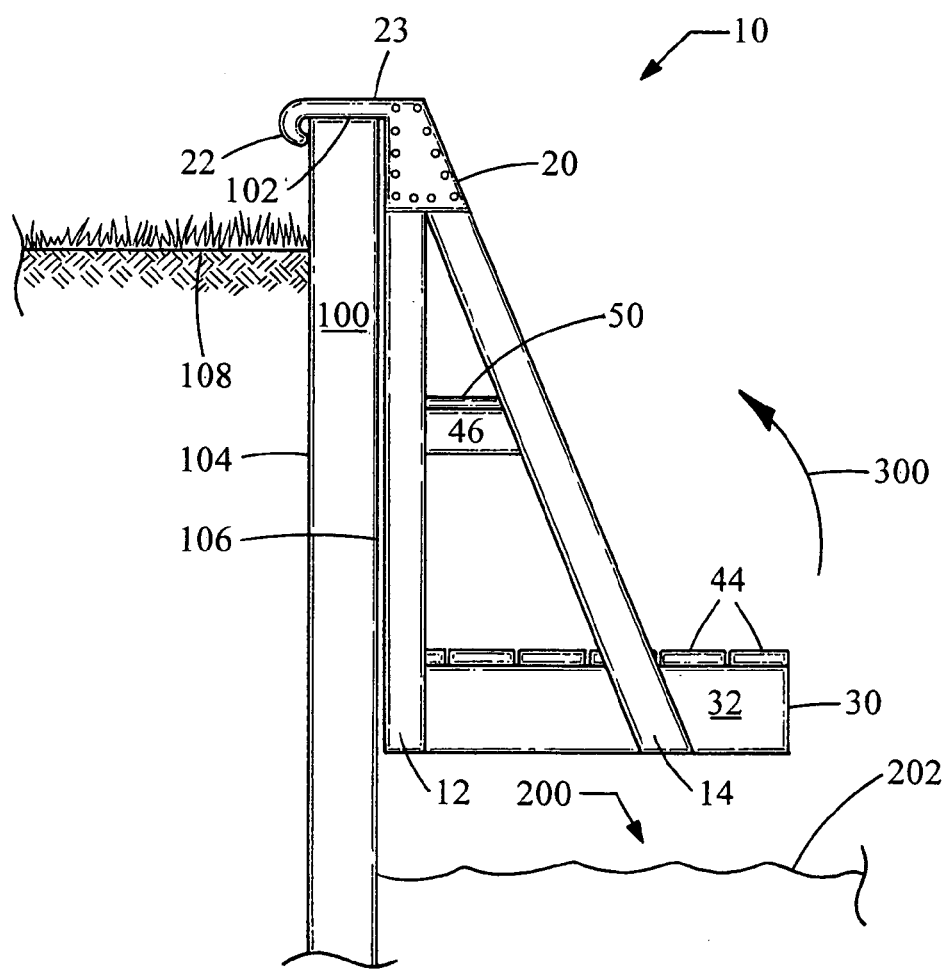
FIG. 3 is a partial perspective view of the conveyance stabilization assembly which is shown in FIG. 2 in an assembled relationship with a conventional conveyance.

Referring now to FIG. 3, there is shown the assembly 10 in a coupled relationship with a conventional sea wall, such as sea wall 100. As shown, the sea wall 100 includes a top lip 102, a first side 104, and a second side 106. Particularly, the first side 104 of the sea wall 100 abuts up to earth or other man made material (e.g., concrete) 108 and the second side 106 abuts the water 202 of a body of water 200. More particularly and in the most preferred embodiment of the invention, the assembly 10 is removably coupled to the sea wall 100, such that the arm portions 23, 27 of the hook portions 20, 26, abut the top lip 102 of the sea wall 100, while the grip portions abut and frictionally engage the first side 104, and while the pillars 12, 14, 16, 18, and the first platform 30 (and second platform 50) engage at least a portion of the second side 106 of the sea wall 100. As should be appreciated by one skilled in the relevant art, if a portion, of the assembly 10 engages or abuts the second side 106 of the sea wall 100 while the grip portions 22, 28, frictionally engage the first side 104 and the arm portions 23, 27 abut the top lip 102 of the sea wall 100, the assembly 10 may only be removed from the sea wall 100 if the platform 30 is lifted and rotated in the direction of arrow 300. In this manner, the assembly 10 will remain substantially fixed upon the sea wall 100 in a desired location until a user of the assembly 10 selectively and systematically moves the assembly 10 in the direction of the arrow 300, thereby allowing the assembly 10 to be subject to a multitude of various natural forces (e.g., impacts with a water craft, changing levels of the body of water 200, weight placed upon the assembly 10, and/or substantially any other accidental or natural force which acts upon the assembly 10) without the assembly 10 undesirably becoming dislodged from the sea wall, until such time that the assembly 10 is selectively and purposefully removed from the sea wall by a user.

It should be understood that this invention is not limited to the exact construction or embodiments listed and described, but that various changes may be made without departing from the spirit and scope of the invention.

What is claimed is:

1. An assembly comprising:
   a pair of substantially identical hook portions which are each coupled to at least one platform by the respective use of a first vertical pillar portion, a first angled pillar portion, a second vertical pillar portion, and a second angled pillar portion, said pair of hook portions frictionally engaging a portion of a sea wall to suspend said platform above a body of water, wherein said pair of substantially identical hook portions each include:
   a generally hollow cavity;
   an arm portion which is coupled to said generally hollow cavity; and
   a grip portion which is coupled to said arm portion, wherein said first vertical pillar portion and said first angled pillar portion are disposed within said generally hollow cavity of a first of said pair of substantially identical hook portions; wherein said second vertical pillar portion and said second angled pillar portion are disposed within said generally hollow cavity of a second of said pair of substantially identical hook portions.

2. The assembly of claim 1 wherein said first vertical pillar portion and said second angled pillar portion are disposed within said first hook portion at a first angle, and wherein said second vertical pillar portion and said second angled pillar portion are disposed with said second hook portion at a second angle which is substantially identical to said first angle.

3. The assembly of claim 2 wherein said at least one platform further comprises a first platform and a second substantially smaller platform, said first platform including:
a first side;
a second side which is coupled to said first side at a ninety degree angle;
a third side which is coupled to said second side at a ninety degree angle;
a fourth side which is coupled to said third side and to said first side at a ninety degree angle;
a bottom side which is coupled to said first, said second, said third, and said fourth sides, thereby creating a generally hollow platform cavity; and
a top side which is coupled to said first, said second, said third, and said fourth sides, thereby covering said generally hollow platform cavity.

4. The assembly of claim 3 wherein said second platform being removably coupled to said pillar portions at a midpoint between said hook portions and said first platform, said second platform being coupled perpendicular to said first and said second vertical pillar portions and parallel to said first platform and said arm portions.

5. The assembly of claim 4 wherein said first platform further includes:
a selectively movable lid portion which is disposed between said top side and said first, said second, said third, and said fourth sides; and
a hinge portion which is coupled to said top side, said selectively movable lid portion, and said third side of said platform, wherein said hinge portion allows said selectively movable lid portion to move from a first closed position to a second open position which permits entry into said generally hollow platform cavity.

6. The assembly of claim 5 wherein said assembly further includes a fastening assembly, said fastening assembly being coupled to said assembly, such that said fastening assembly is accessible to tie off a watercraft.

7. The assembly of claim 3 wherein said assembly further comprises and amount of non-buoyant material which is disposed within said generally hollow platform cavity, thereby causing said assembly to be non-buoyant.

8. The assembly of claim 3 wherein said assembly further comprises an amount of buoyant material which is disposed within said generally hollow platform cavity, thereby causing said assembly to be buoyant.

9. A safety and accessibility assembly for use with a sea wall, said assembly comprising:
a first hook portion having a generally hollow cavity therein;
a second hook portion having a generally hollow cavity therein, said second hook portion being substantially identical to said first hook portion;
a first vertical pillar portion which is disposed within said generally hollow cavity of said first hook portion;
a second vertical pillar portion which is disposed within said generally hollow cavity of said second hook portion;
a first angled pillar portion which is disposed within said cavity of said first hook portion, said first angled pillar portion abutting said first vertical pillar portion within said cavity;
a second angled pillar portion which is disposed within said cavity of said second hook portion, said second angled pillar portion abutting said second vertical pillar portion within said cavity; and
at least one platform which is coupled to said pillar portions at an end opposite of said hook portions.

10. The assembly of claim 9 wherein said pair of substantially identical hook portions each include:
an arm portion which is coupled to said generally hollow cavity; and
a grip portion which is coupled to said arm portion, said arm portion being adapted to span a portion of said sea wall and said grip portion being adapted to frictionally and removably engage a portion of said sea wall.

11. The assembly of claim 10 wherein said first vertical pillar portion and said second angled pillar portion are disposed within said first hook portion at a first angle, and wherein said second vertical pillar portion and said second angled pillar portion are disposed with said second hook portion at a second angle which is substantially identical to said first angle.

12. The assembly of claim 11 wherein said at least one platform further comprises a first platform and a second substantially smaller platform, said first platform including:
a first side;
a second side which is coupled to said first side at a ninety degree angle;
a third side which is coupled to said second side at a ninety degree angle;
a fourth side which is coupled to said third side and to said first side at a ninety degree angle;
a bottom side which is coupled to said first, said second, said third, and said fourth sides, thereby creating a generally hollow platform cavity; and
a top side which is coupled to said first, said second, said third, and said fourth sides, thereby covering said generally hollow platform cavity.

13. The assembly of claim 12 wherein said second platform is removably coupled to said pillar portions at a midpoint between said hook portions and said first platform, said second platform being coupled perpendicular to said first and said second vertical pillar portions and parallel to said first platform and said arm portions.

14. The assembly of claim 13 wherein said first platform further includes:
a selectively movable lid portion which is disposed between said top side and said first, said second, said third, and said fourth sides; and
a hinge portion which is coupled to said top side, said selectively movable lid portion, and said third side of said platform, wherein said hinge portion allows said selectively movable lid portion to move from a first closed position to a second open position which permits entry into said generally hollow platform cavity.

15. The assembly of claim 14 wherein said assembly further includes a fastening assembly, said fastening assembly being coupled to said assembly, such that said fastening assembly is accessible to tie off a watercraft.

16. The assembly of claim 12 wherein said assembly further comprises and amount of non-buoyant material which is disposed within said generally hollow platform cavity, thereby causing said assembly to be non-buoyant.

17. The assembly of claim 12 wherein said assembly further comprises an amount of buoyant material which is disposed within said generally hollow platform cavity, thereby causing said assembly to be buoyant.

18. An assembly comprising:
a pair of substantially identical hook portions which are each coupled to at least one platform by the respective use of at least a first pillar portion and at least a second pillar portion, wherein, said pair of hook portions frictionally engaging a portion of a sea wall to suspend said platform above a body of water, wherein said pair of substantially identical hook portions each include:
a generally hollow cavity;
an arm portion which is coupled to said generally hollow cavity; and
a grip portion which is coupled to said arm portion, and wherein said at least said first pillar portion is disposed within said generally hollow cavity of a first of said pair of substantially identical hook portions, and wherein said at least said second pillar portion is disposed within said generally hollow cavity of a second of said pair of substantially identical hook portions.

* * * * *